Aug. 28, 1945.　　G. G. LANDIS ET AL　　2,383,725
ELECTRIC WELDING APPARATUS
Filed Feb. 25, 1943
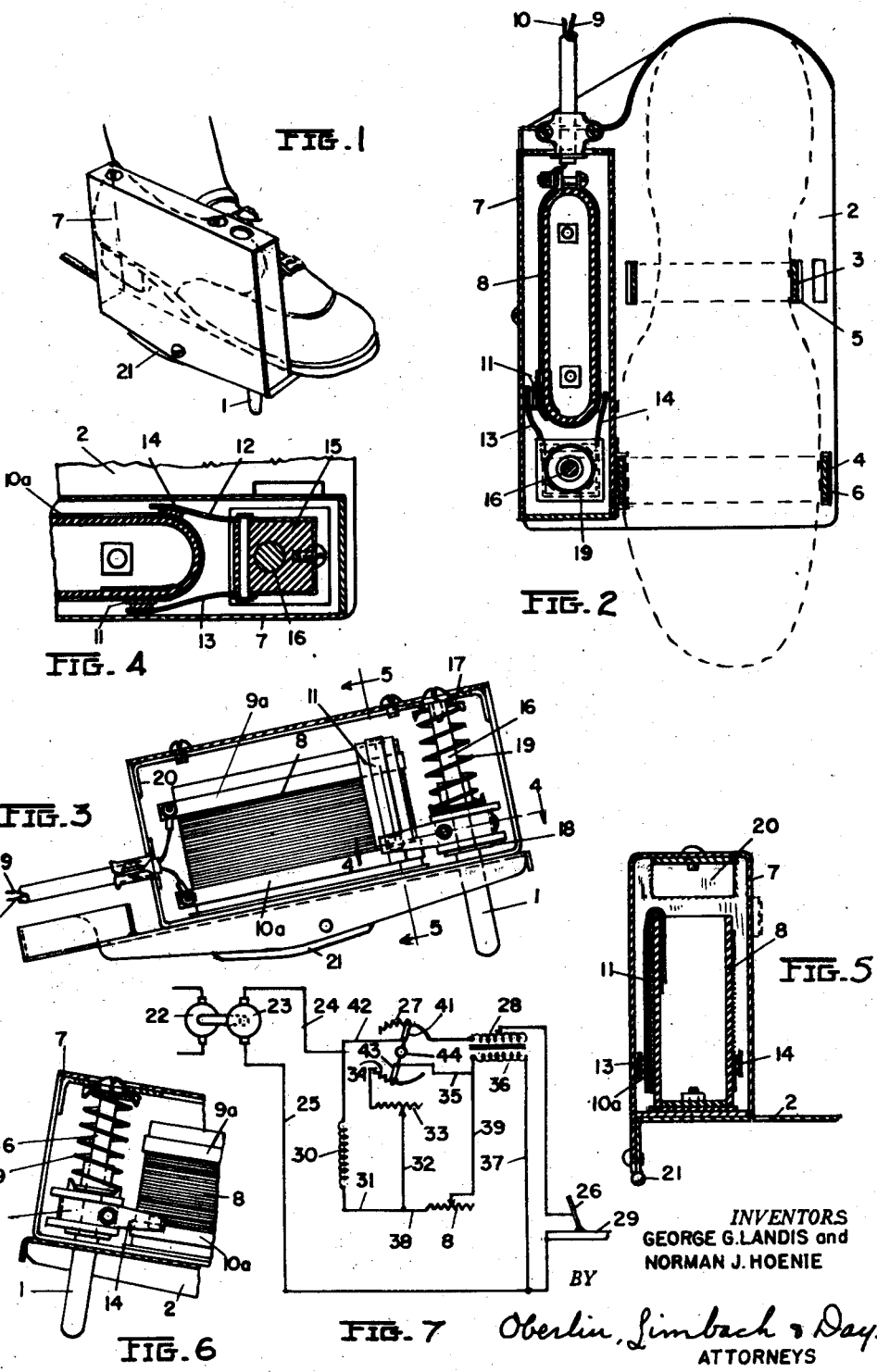
INVENTORS
GEORGE G. LANDIS and
NORMAN J. HOENIE
BY Oberlin, Limbach & Day
ATTORNEYS Patented Aug. 28, 1945

2,383,725

UNITED STATES PATENT OFFICE 2,383,725

ELECTRIC WELDING APPARATUS

George G. Landis, University Heights, and Norman J. Hoenie, Cleveland Heights, Ohio, assignors to The Lincoln Electric Company, Cleveland, Ohio, a corporation of Ohio Application February 25, 1943, Serial No. 477,066

9 Claims. (Cl. 171—229)

This invention relates as indicated to electric welding apparatus and more particularly to apparatus useful for the purpose of adjustably controlling the characteristics of the welding circuit so that the same may correspond to the requirements of the arc from time to time.

In most arc welding operations, the welding current is supplied by means of a motor generator set which is located at a point remote from the place where the welding is done. One lead of the welding circuit from the generator is attached to the work and the other lead to a holder manipulated by the operator and within which the electrode is supported.

While the characteristics on the welding circuit for the particular operation may be roughly adjusted by a setting of the controls of the generator, many times it is necessary or highly desirable that the operator be able to instantaneously, and without leaving the welding post, change the characteristics of the welding circuit.

It is also desirable that the means provided whereby the operator may make the adjustments as aforesaid shall be capable of ready and easy manipulation, and preferably without requiring the welding operator to use either of his hands, since the operator's both hands are usually otherwise occupied with the welding operation.

It is a principal object of our invention, therefore, to provide an apparatus by which the necessary control may be effected in the desirable manner indicated above.

Other objects of our invention will appear as the description proceeds.

To the accomplishment of the foregoing and related ends, said invention then comprises the features thereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

Fig. 1 is a perspective view of a portion of the apparatus comprising my invention shown strapped to the foot of a welding operator;

Fig. 2 is a plan view, partially in section, of the apparatus illustrated in Fig. 1;

Fig. 3 is a side elevational view, partially in section, of the apparatus illustrated in the previous figures;

Fig. 4 is a fragmentary transverse sectional view of the apparatus illustrated in Fig. 3, taken on a plane substantially indicated by the line 4—4;

Fig. 5 is a transverse sectional view of the apparatus illustrated in Fig. 3, taken on a plane substantially indicated by the line 5—5;

Fig. 6 is a fragmentary sectional view similar to a portion of Fig. 3 but showing the opposite side of the same apparatus; and Fig. 7 is a diagrammatic showing of a particular welding circuit, arranged in accordance with the principles of our invention, and incorporating as a component thereof the rheostat shown in the previous figures.

Referring now more specifically to the drawing, and more especially to Fig. 1, the apparatus here illustrated is a rheostat assembly forming one component of the welding circuit illustrated in Fig. 7. This assembly is adapted to be strapped to the foot of the welding operator and comprises, as hereinafter more particularly pointed out, a control arm or lever 1 which projects from the assembly in such a way, and is so arranged within the assembly, that the rheostat may be adjusted by merely pressing the arm 1 against a solid object.

The rheostat assembly comprises a base plate generally indicated at 2, provided with suitable openings, such as 3 and 4, for the passage therethrough of securing straps 5 and 6 respectively by which the assembly may be secured to the foot.

On one side of the plate 2, the same carries a vertically disposed housing 7 in which is mounted a resistance coil 8 carried on a suitable support, and from which are carried leads 9 and 10 through a suitable cable. One lead is connected to a wiper bar 11 arranged on one side of the coil as illustrated in Fig. 3. A U-shaped contact arm 12, the form of which is most clearly illustrated in Fig. 4, is provided with opposite legs 13 and 14 which respectively engage the wiper bar 11 and the windings of the resistor at the opposite side thereof.

The member 12 of conductive material is mounted on a block 15 of insulating material which is in turn secured to a shaft 16, the lower terminus of which constitutes the arm 1. The shaft or pin 16 is guided in a suitable opening at the upper end of the casing as indicated at 17, and in the lower portion of the casing in a bracket, as indicated at 18. A spring 19, under compression, resiliently maintains the assembly in the condition illustrated in Fig. 3.

The resistor may be so wound that the normal condition of the arm as illustrated in Fig. 3 is such that all of the resistance is in series between the two leads. Or, alternatively, it may be so wound that the two leads are short-circuited, and the resistance is progressively cut in as the assembly is depressed, moving the arm 1 upwardly with the parts viewed as in Fig. 3. The casing 7 is preferably provided with openings at opposite ends near the top, as indicated at 20, for the purpose of ventilating the casing and dissipating the heat generated therein by the resistor.

The plate 2 at opposite points is provided with rocker flanges 21, the form of which in side elevation is shown in Fig. 3, that is, there will be a flange on each side of the plate and a corresponding wearing shoe 21 on each side of the plate, with only one of the same, however, illustrated in side elevation in Fig. 3. The location of this angular rocker plate is such that when the assembly is strapped to the foot, the apex or fulcrum point is approximately under the middle of the foot to facilitate not only a rocking of the assembly when in engagement with a solid surface for the purpose of adjusting the position of the resistor control arm, but such rocker plate also makes it easy for the operator to walk in a substantially normal manner with the assembly strapped to his foot but not in use.

As indicated, this control apparatus or rheostat is primarily designed for use in connection with an arc welding system, and in Fig. 7 is illustrated an arc welding system which we believe to be new, and which embodies this rheostat as a component part.

Referring now more particularly to Fig. 7, the welding current is supplied by means of a motor generator set, the motor of which is indicated at 22, and the generator at 23. To the opposite brushes of the generator armature are connected leads 24 and 25. The lead 24 is connected to the welding electrode 26 through a variable resistance 27 and a variable induction coil primary 28. The work to be welded, indicated at 29, is connected to the generator by means of the lead 25.

It should be noted that the inductance above referred to may be fixed instead of variable, and that also for certain types of machines this inductance including both primary and secondary windings 28 and 36 respectively may be omitted entirely.

The field excitation of the generator is secured, in part at least, by means of a shunt field winding indicated at 30. While the generator may be compound wound, or provided with other and additional exciting windings, it is, nevertheless, believed unnecessary to further illustrate such, since the same form no part of the present invention.

The field 30 is connected from the line 24 by means of the leads 31 and 32 through a first variable resistance 33 and a second variable resistance 34, a lead 35, the secondary winding 36, and the lead 37, to the opposite line 25. Connected in parallel with the resistances 33 and 34 by means of the leads 38 and 39 is the variable resistance 8 which will be identified as the variable resistance of the assembly illustrated in Figs. 1 to 6.

It will be noted that the variable resistances 27 and 34 are mechanically but not electrically inter-connected. The wiper arm 41 is connected by means of the lead 42 to the line 24. The wiper arm 43 is connected by means of the lead 35 to the line 39. Both wiper arms 41 and 43 are mounted on a common shaft 44, although electrically insulated from each other. The resistance grids 27 and 34 are so arranged that when the wiper arm 41 is in the extreme counter-clockwise position on the resistance grid 27, all of both resistance grids 27 and 34 will be in series in their respective circuits.

Now as the wiper arm shaft 44 is rotated in a clockwise direction, the resistor grid 27 will be progressively cut out, while, at the same time, all of the resistor grid 34 is maintained in the circuit of the latter. The parts are so arranged that when the wiper arm 41 has cut out all of the resistor grid 27, wiper arm 43 then, and not until then, will begin to cut out the resistor grid 34.

The rheostat illustrated in the previous figures is preferably so constructed when employed with a system like that illustrated in Fig. 7 so that the spring 19 normally maintains all of the resistance grid 8 in series with the circuit of the resistor. In this connection it may be well to observe that the slide bar 11 is in electrical contact with the lower bus bar 10a, connected to the lead 10, and insulated from the upper bus bar 9a, connected to the lead 9.

It is believed that the advantages of the welding system above described and as illustrated in Fig. 7 may be somewhat more fully appreciated by having reference to a specific embodiment. The resistance 27 being merely in series with the arc is simply employed for the purpose of obtaining the proper welding current and in no way otherwise affects any control over the generator. Let us assume that the welding generator is of such construction, and so adjusted, that the welding circuit has a normal voltage of 55 at 200 amperes and below. When all of the resistance grid 27 is cut out, then further clockwise rotation of the shaft 44 will progressively cut out the resistor grid 34, and accordingly progressively increase the voltage of the machine from 55 to a maximum of 65 for example.

The rheostat 33 is the one normally employed for the purpose of controlling the excitation of the machine, and accordingly the open circuit voltage. Let us assume that the normal maximum open circuit voltage of the machine is 55 at 200 amperes and below. However, the rheostat 33 is set so that for normal operation, the open circuit voltage is for example 40 volts. The operator can, by pressing down his foot to the limit, short-circuit the resistances 33 and 34, and instantaneously raise the open circuit voltage of the machine to a maximum of 65. This is very desirable and is made possible by the fact that the rheostat 33 can be left at one setting for a period of days, whereas, the foot-controlled rheostat 8 is never left in the fully depressed position for any considerable length of time. This difference permits the use of the higher excitation values momentarily when using the foot-controlled rheostat, whereas, such higher excitation values would not be safe if incorporated into the machine rheostat 33 itself.

While a preferred embodiment of welding circuit, in accordance with our invention as shown in Fig. 7, includes the auxiliary rheostat 34 for the function previously explained, nevertheless, for many uses this refinement need not be employed, in which case, one end of the resistance grid 33 would be connected directly to the lead 39 instead of through the resistance 34 as shown.

It will be observed by thus connecting the foot-controlled rheostat in parallel with the main machine rheostat 33, a number of advantages are secured:

(1) Only a small part of the total heat generated by the two rheostats is dissipated by that rheostat which is attached to the body of the operator;

(2) The portable rheostat carried about by the operator may be extremely light in weight;

(3) The machine rheostat 33 may be set for standard welding operations, and the operator then need manipulate the portable rheostat only at very short periods as when striking the arc and when a higher open circuit voltage is momentarily desired; and (4) The portable rheostat is connected in a parallel circuit so that when connecting and disconnecting the same to the machine it is never necessary to open an entire line.

The particular construction of the portable rheostat is such that it may be worn comfortably by the operator even while he is not actually welding. It does not interfere with his normal locomotion and may be quickly attached and detached from his foot when desired. While the modification illustrated in the drawing is adapted as indicated for attachment to the operator's foot, it will be observed that the attaching plate may be readily changed in structure so as to permit attachment of the rheostat to other parts of the operator's body, such as his knee, elbow, etc.

The projecting arm or shaft which need merely be so arranged that the operator may conveniently, by movement of that part of his body to which the rheostat is attached, move the arm or rod 1 into contact with a solid surface, and in this way, the setting of the portable rheostat is easily and accurately controlled. This arrangement of the control arm or rod 1, and the fact that it is spring-loaded to always return the same to the starting position, are features which are believed entirely novel over similar structures available in the prior art.

Other modes of applying the principle of our invention may be employed, change being made as regards the details described, provided the features stated in any of the following claims or the equivalent of such be employed.

We, therefore, particularly point out and distinctly claim as our invention:

1. An arc-welding system comprising a variable resistor stationed at a central point and so connected with the welding circuit as to adjustably control the normal electrical characteristics thereof, and a portable adjustable resistor connected in parallel with said first-named resistor and adapted to vary such normal characteristics when desired by the operator.

2. An arc-welding system comprising a welding current generator, an adjustable resistor mounted adjacent the generator and adapted to determine the normal output of the latter, and a portable resistor connected in parallel with, and adapted to vary such normal output without readjusting said first-named resistor.

3. An arc-welding system comprising a welding current generator, a stationary adjustable resistor connected in series with a field winding of said generator, and a portable adjustable resistor connected in parallel with said first-named resistor.

4. An arc-welding system comprising a welding current generator, a stationary adjustable resistor connected in series with a field winding of said generator, and a portable resistor connected in parallel with said first-named resistor, said portable resistor being adjustable by the operator to increase or decrease the resistance of such field winding circuit.

5. An arc-welding system comprising a welding current generator having a shunt field winding, a stationary adjustable resistor connected in series with such field winding, whereby a welding current of predetermined normal character may be provided, and a portable resistor connected in parallel with said first-named resistor, said portable resistor being adjustable by the operator to increase or decrease the resistance of such field winding circuit.

6. An arc-welding system comprising a welding current generator and an arcing circuit connected thereto, an adjustable resistor in series in said circuit, an adjustable resistor in series with a field winding of said generator and means interconnecting said resistors whereby actuation of the one involves actuation of the other, the one resistor being entirely cut out while any part of the other is included in the circuit of said field winding, and vice versa.

7. An arc-welding system comprising a welding current generator and an arcing circuit connected thereto, an adjustable resistor in series in said circuit, an adjustable resistor in series with a field winding of said generator, means interconnecting said resistors whereby actuation of the one involves actuation of the other, and a portable adjustable resistor connected in parallel with the resistor in said field winding.

8. An arc-welding system comprising a welding current generator and an arcing circuit connected thereto, an adjustable resistor in series in said circuit, an adjustable resistor in series with a field winding of said generator, means interconnecting said resistors whereby actuation of the one involves actuation of the other, a second independently adjustable resistor in series with said field winding, and a portable adjustable resistor connected in parallel with the first mentioned, inter-connected, resistor in said field winding circuit.

9. An arc welding system comprising a welding current generator having a shunt wound field and an arcing circuit connected to said generator, an adjustable resistor in series in said circuit, an adjustable resistor in series with such field winding of said generator, means interconnecting said resistors whereby actuation of the one involves actuation of the other, a second independently adjustable resistor in series with said field winding, and a portable adjustable resistor connected in parallel with the first mentioned, inter-connected, resistor in said field winding circuit.

GEORGE G. LANDIS.
NORMAN J. HOENIE.